Sept. 1, 1925.

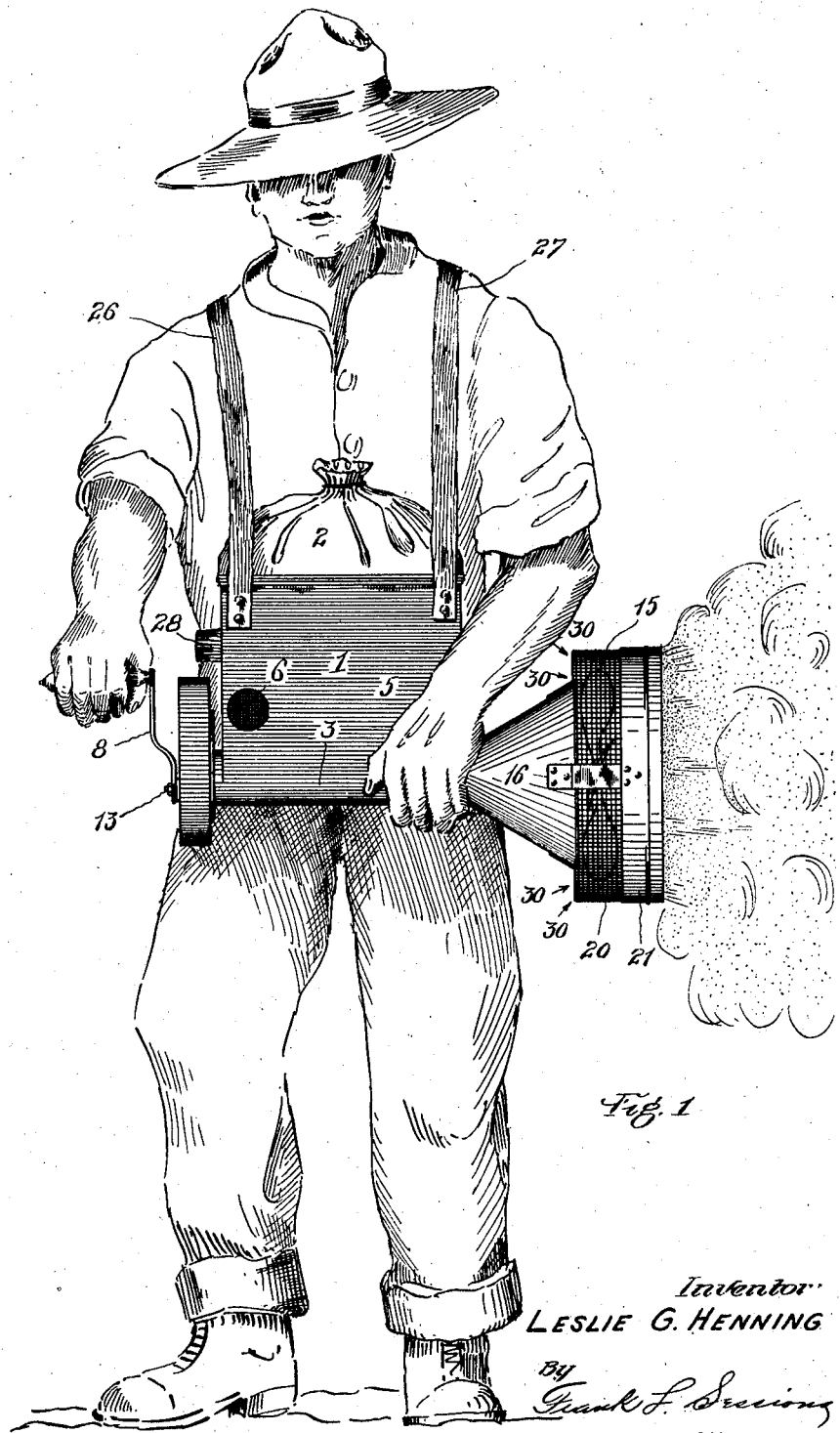

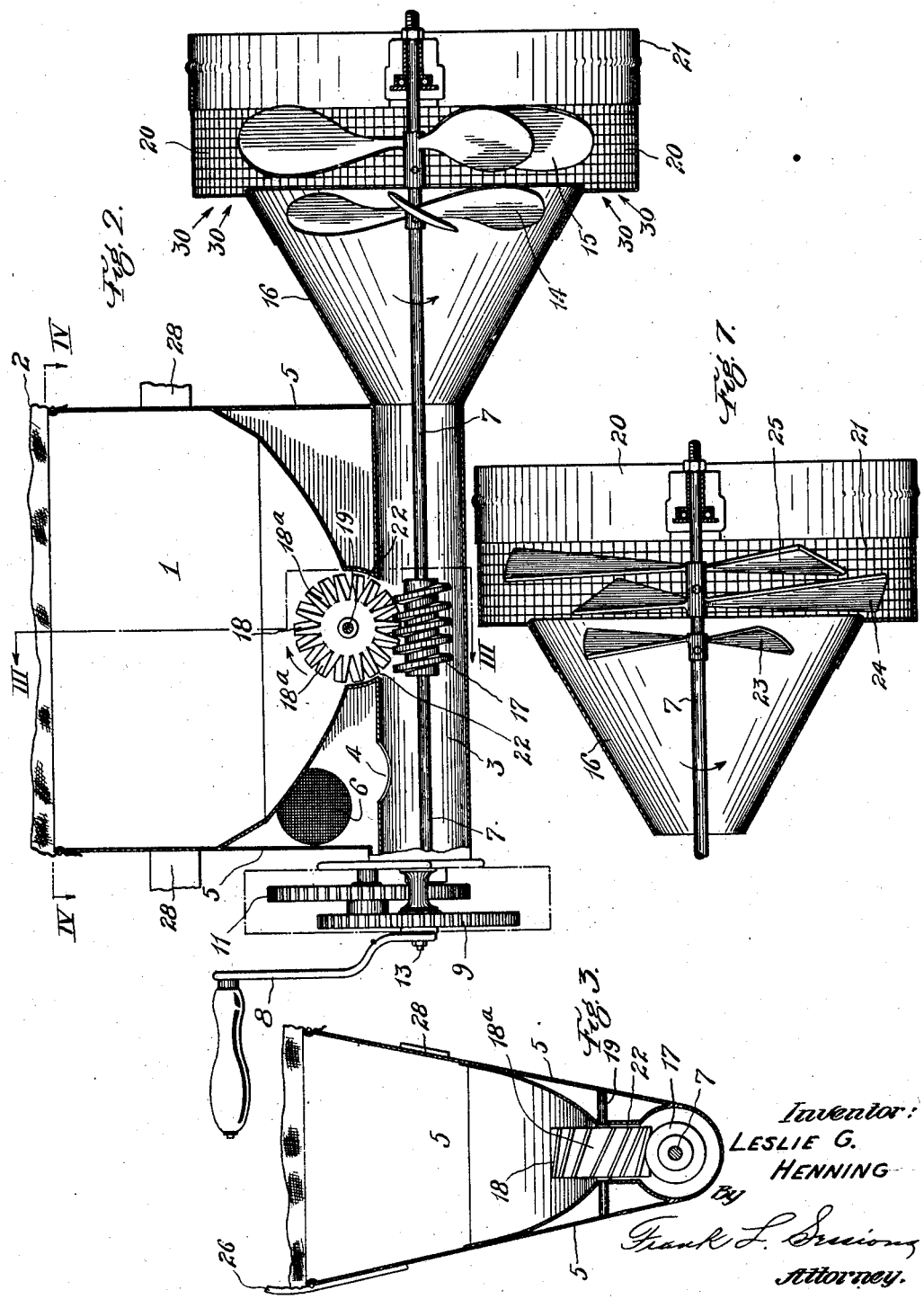

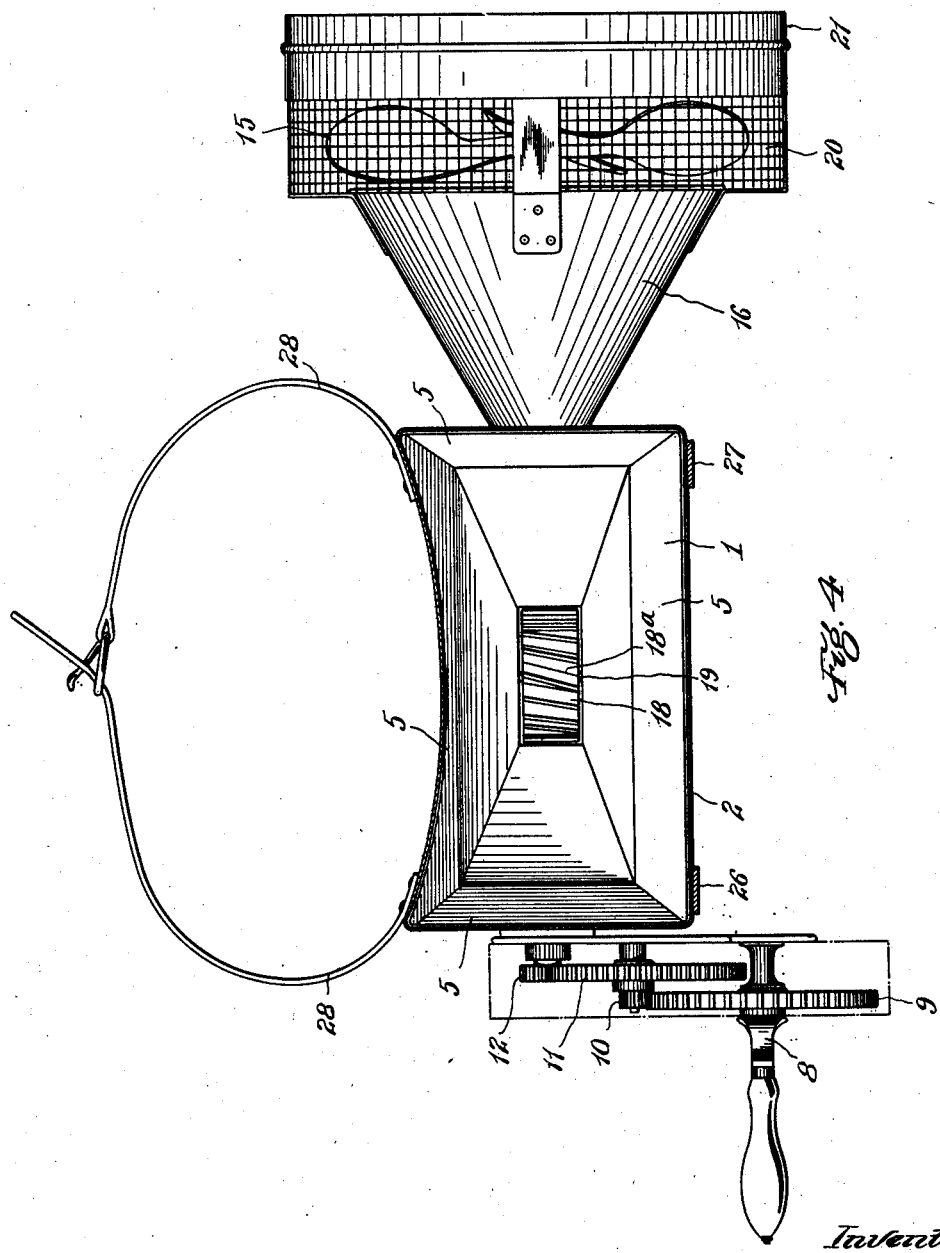

L. G. HENNING 1,551,877

DRY POWDER DUSTER AND METHOD OF FORMING DUST CLOUDS

Filed Sept. 22, 1920   4 Sheets-Sheet 4

Inventor:
LESLIE G. HENNING
By
Frank L. Sessions
Attorney

Patented Sept. 1, 1925.

1,551,877

UNITED STATES PATENT OFFICE.

LESLIE G. HENNING, OF CLEVELAND, OHIO, ASSIGNOR OF ONE-THIRD TO FRANK L. SESSIONS, OF LAKEWOOD, OHIO, AND ONE-THIRD TO HARLAN H. NEWELL, OF LAKEWOOD, OHIO.

DRY-POWDER DUSTER AND METHOD OF FORMING DUST CLOUDS.

Application filed September 22, 1920. Serial No. 412,000.

*To all whom it may concern:*

Be it known that I, LESLIE G. HENNING, a citizen of the United States, residing at Cleveland, in the county of Cuyahoga and State of Ohio, have invented certain new and useful Improvements in Dry-Powder Dusters and Methods of Forming Dust Clouds, of which the following is a specification.

My invention relates to apparatus for and methods of dusting plants, shurbs, vines, trees and other vegetation with dry insecticide powder, and is particularly adapted to the dusting of cotton plants with arsenate of calcium. My invention may be used for the formation of dust clouds for other purposes or for the sowing of grass and other seeds broadcast.

The principal objects of my invention are the provision of a new and useful apparatus for mixing finely divided materials or impalpable powders with air and discharging the mixture from the apparatus in a dust cloud, and the provision of a new and useful method of forming dust clouds. Other objects of my invention are the provision of means for continuously feeding dry powder or other finely divided material into a rapidly moving column of air; the provision of means for diluting a dense mixture of dust or other finely divided material and air with more air and discharging the diluted mixture into the atmosphere near the plants or other objects to be dusted; and the provision of means for feeding dust or other finely divided materials at a predetermined rate into the inlet duct of a propeller fan. These and other objects of my invention are attained by carrying out the methods and by the use of the apparatus herein described and shown in the accompanying drawings in which Fig. 1 is an assembly view of a hand power machine in operation;

Fig. 2 is a vertical longitudinal section through a preferred form of the apparatus of my invention;

Fig. 3 is a section on line III—III of Fig. 2;

Fig. 4 is a plan view partly in section on line IV—IV of Fig. 2;

Fig. 5 is an end elevation as seen from the left hand end of Fig. 2;

Fig. 6 is an end elevation as seen from the right hand end of Fig. 2;

Fig. 7 is a fragmentary longitudinal section showing a modified fan arrangement; and Fig. 8 is an end view of the apparatus shown in Fig. 7.

The machine shown in the drawings is a hand-power duster for dusting cotton plants with arsenate of calcium.

Referring to the drawings, 1 represents a hopper composed of sheet metal and preferably provided with a cloth top or closure such as is shown at 2. Beneath the hopper, 1, is the hollow duct, 3, provided with an air inlet, 4. The wall, 5, of the hopper body is extended downwards to form a supporting connection between the hopper, 1, and the duct, 3, and in this wall, 5, suitable openings, 6, are provided which are preferably protected by wire gauze, as shown, to prevent leaves, sticks and insects from being drawn into the duct, 3. Through the duct, 3, there extends a shaft, 7, which is adapted to be rotated at a high speed. In the form of my invention shown in the accompanying drawings the shaft is driven by hand power by means of the crank, 8, through the speed multiplying gears, 9, 10, 11 and 12, the first of which is mounted upon the crank shaft, 13, and is driven by the crank, 8, and the last one of which, 12, is mounted upon the shaft, 7, and secured thereto for rotation therewith. Upon the shaft, 7, there are mounted and secured for rotation therewith preferably two propeller fans, 14 and 15, the first and smaller of which, 14, is within the funnel shaped housing, 16, the smaller end of which is connected to duct, 3. Upon shaft, 7, there is also mounted and secured for rotation therewith a worm, 17, which drives a feed worm-wheel, 18, carried by a cross shaft, 19, which has bearings in the sides of the housing, 5. A wire screen, 20, is preferably employed to protect the blades of fan, 15, and to prevent accidental injury to the operator. A tubular housing, 21, may be employed to direct the discharge from fan, 15, if desired.

Worm-wheel, 18, rotates in a feed-opening, 22, which connects hopper, 1, with duct 3.

In the modified form of fan arrangement shown in Figs. 7 and 8 there are employed three fans, 23, 24 and 25, each having two blades. It is to be noted that these fans are of the propeller type discharging their out-put axially of the fan instead of radially as in the case of centrifugal fans or blowers. It will also be noted that each succeeding fan is arranged and proportioned so that it will draw in fresh or unmixed air in addition to the out-put of the preceding fan, so that the dust density of the air becomes less and less as it passes through the series of fans.

The operation of the machine shown in the drawings is as follows: Assuming, for instance, that the hopper, 1, contains a quantity of powdered insecticide, and that the machine is strapped to the operator by means of shoulder straps, 26, 27, and belt, 28, as shown in Fig. 1. The operator walks along between the rows of plants or adjacent to them turning the crank, 8, as he walks. The fans, 14 and 15, are thus revolved rapidly, air is drawn through the inlet openings, 6, through the opening, 4, through the duct, 3, and past the feed opening, 22, which connects the hopper, 1, with the duct, 3. At the same time worm-wheel, 18, is revolved by worm, 17, and as it revolves it carries with it between its teeth in the deeply cut spaces or buckets, 18$^a$, a quantity of the powdered insecticide which it delivers into the duct, 3. This is picked up by and mingles with the rapidly moving column of air and is carried outward, in a relatively densely laden stream, through the housing, 16, by the fan, 14, and delivered into the space described by the fan, 15.

The worm-wheel, 18, serves also as an agitator of the material in the hopper, 1, to prevent it from clogging the feed opening, 22, and to insure that the material continually falls to the bottom of the hopper to be scraped or carried by the teeth of the worm wheel through the feed opening into the duct, 3.

The densely laden air emerging from duct, 3, expands in the funnel shaped housing, 16, and is given a rotary motion and rapidly beaten by the blades of fan, 14, so that the particles of powder carried by the air are separated and thoroughly diffused in the stream of air which is conveying them.

The fan, 15, is so proportioned and located that it draws air into the space which it describes through the screen, 20, as indicated by the arrows, 30. This fresh air mingles with and dilutes the densely dust-laden air discharged by fan, 14, into the space described by fan, 15, and the fan, 15, discharges this diluted stream thinly laden with thoroughly diffused dust into the atmosphere in the direction of the plants or other objects to be dusted in the form of a dust cloud which settles down upon them.

The air which passes through duct, 3, becomes relatively densely laden with the dust fed into it from the hopper, 1, and would not, if discharged directly into the atmosphere, diffuse the dust sufficiently for the most economical use of the insecticide. By the use of a plurality of fans I dilute the relatively densely laden stream of air which emerges from the duct, 3, and fan, 14, with more air drawn into the path of the fan, 15, thereby diffusing the dust to a greater extent, throwing it into the atmosphere in a much thinner cloud and effecting a marked economy of insecticide. By the use of my invention the same quantity of insecticide powder causes much greater effective destruction of plant pests, such as the boll-weevil, than has heretofore been possible by other methods or apparatus known to me.

The rate of feed of the powder into the stream of air in the duct, 3, may be predetermined by suitably proportioning the feeding apparatus and the speed at which it runs so that the amount of insecticide dusted upon an acre of plants may be regulated in any desired manner. The amount of powder fed into the intake air which passes through duct, 3, is dependent upon the number of buckets, 18$^a$, in the worm wheel, 18, and upon the size of those buckets. It is further dependent upon the speed of rotation of the worm wheel, 18. By the use of worm wheels having different numbers of teeth or depths of buckets or both, or, by varying the pitch of the thread of the worm, 17, the rate of feed of the dust may be correspondingly varied.

It will be seen that in the forming of dust clouds, I first cause the desired amount of dust to be mixed with a relatively small amount of air, which may be regarded as the first step in my improved method. I then cause this relatively densely dust-laden air to be mixed with more air, and repeat this diluting operation as many times as desired (by using more fans in series), and finally discharge the thin cloud of dust into the atmosphere. In brief this may be called a multiple-stage method of mixing dust and air. It is evident that the thinner the cloud the greater will be the area that may be dusted with a given amount of material.

An advantageous feature of the construction of my duster is that of feeding the dust into the inlet or suction duct of the primary fan, 14, thereby eliminating the possibility of blowing the dust backward through the hopper into the face of the operator, which is an unsafe thing to do when poisonous insecticides are used. In some dusters with which I am familiar the pressure generated by the centrifugal fans used is against the incoming dust so that unless the hopper be closed air tight, the dust is being continually blown backward into the face of the operator.

A further advantage of feeding the dust from the hopper into the inlet duct of the fan is that there is thus created a suction upon the material in the hopper which makes it possible to cut down the rate of feed to an extremely small amount and still secure a constant flow of material. This is not possible where the material is fed into the conveying air against pressure as is done in other dusters with which I am familiar.

I have found that the use of the propeller type of fan is advantageous in the forming of dust clouds, as, if the material is fed into the intake of the fan, it is not subjected to the violent centrifugal separating effect when passing through the fan that it is subjected to when passed through a centrifugal type of fan. I have found also that the propeller type fan discharging its out-put axially of the fan, directly into the atmosphere, will diffuse the dust through a greater space and cause it to travel a greater distance than a centrifugal fan will for the same expenditure of effort.

A further advantage in the use of a propeller fan for forming dust clouds arises from the fact that by varying the angle or pitch of the blades, the character of the discharge stream can be varied, so that the dust may be thrown a greater or less distance in denser or thinner clouds of smaller or greater volume respectively. This is impossible with other types of fans with which I am familiar.

I do not limit my invention to hand-power operation, nor do I limit it to the use of the particular form of apparatus shown and described herein.

Having thus described my invention I claim:

1. In a dry powder duster, a supply hopper, a duct below said hopper, a propeller fan at one end of said duct, a feed opening from said hopper to said duct and means for rotating said fan to draw air through said duct past said opening and discharge said air in an axial direction from said fan.

2. In a dry powder duster, a supply hopper, a duct below said hopper, a propeller fan at one end of said duct, a feed opening from said hopper to said duct, a material agitator above said opening, and means for rotating said fan to draw air through said duct past said opening and discharge said air in an axial direction from said fan.

3. In apparatus for dry powder dusting, a material-supply hopper, a propeller fan having its blades inclined to its axis of rotation, adapted when rotated to create an axially moving, rotating column of air, means for rotating said fan, a duct, means for feeding material into said duct from said hopper, and means for causing air to pass through said duct and entrain the material fed into it from said hopper, said duct being adapted to discharge said air and entrained material into said column of air.

4. In a dry powder duster, a material-supply hopper, a duct, said duct having an air inlet and an air outlet, a revoluble propeller fan having its blades inclined to its axis of rotation and adapted to cause air to enter said inlet and pass out of said outlet, and connections between said hopper and said duct adapted to permit material from said hopper to be entrained by the air passing through said duct, whereby said material is carried out of said outlet by said air.

5. In a dry powder duster, two revoluble fans mounted end to end, one of said fans being of larger diameter than the other and adapted to discharge its output in an axial direction from said larger fan, a housing for the smaller one of said fans, a receptacle for containing a quantity of the material to be dusted, an air inlet to said housing for the smaller of said fans, means for feeding material from said receptacle into the air in said housing before it passes through said fan, and connections whereby the smaller of said fans discharges its output into the zone of action of the larger fan whereby said output mingles with the output of said larger fan.

6. The method of forming dust clouds which consists of feeding the dust into a relatively small, radially-confined stream of air, whereby said dust is caused to mingle with and is carried along by said stream of air forming a dust-laden stream, imparting to said dust-laden stream a rapid rotary movement whereby the particles of dust are separated and diffused, simultaneously adding more air to the mixture and discharging the diluted mixture in a relatively large unconfined stream.

7. The method of forming dust clouds which consists of first creating a relatively densely laden mixture of air with dust material, rapidly rotating and simultaneously diluting said mixture with other air, and blowing said diluted mixture into the atmosphere.

8. The method of applying insecticide powder to plants which consists of feeding the powder at a predetermined rate into a rapidly moving column of air of relatively small volume whereby said powder is caused to mingle with said air to form a relatively dense mixture therewith, passing said relatively dense mixture through the space described by a rapidly revolving fan, simultaneously diluting said mixture by adding more air thereto, and discharging said diluted mixture into the atmosphere near said plants.

9. In a dry powder duster, a revoluble fan, a funnel-shaped housing surrounding said fan having a restricted inlet opening at its smaller end and an unrestricted outlet opening at its larger end, said openings being disposed to cause air to enter and leave said housing axially of said fan when said fan is revolving, and means for feeding dust into said air.

10. In a dry powder duster, a funnel-shaped housing, a revoluble fan in said housing, the axis of said fan coinciding with the axis of said funnel-shaped housing, said housing having an inlet opening at one end and an outlet opening at the other end, said fan being adapted when rotated to draw air into said inlet opening and discharge it from said outlet opening, a second revoluble fan mounted for rotation about the extended axis of said first named fan and adapted when rotated to receive the air discharged from said first named fan and discharge it into the atmosphere, and means for feeding dust into said air.

11. In a dry powder duster, a funnel-shaped housing, a revoluble fan in said housing, the axis of said fan coinciding with the axis of said funnel-shaped housing, said housing having an inlet opening at one end and an outlet opening at the other end, said fan being adapted when rotated to draw air into said inlet opening and discharge it from said outlet opening, a second revoluble fan mounted for rotation about the extended axis of said first named fan outside of said housing adapted when rotated to receive the air discharged from said first named fan causing it to mix with other air from the surrounding atmosphere which has not been drawn through said first named fan and discharge said mixture into the atmosphere axially of said fans and said housing, and means for feeding dust into the air which passes through the space described by said first named fan.

12. In a dry powder duster, a funnel-shaped housing open at both ends, a revoluble propeller fan in said housing, said fan having its blades inclined to its axis of rotation and being adapted when rotated to draw air into said funnel from the opening in the smaller end thereof and discharge it through the opening in the larger end thereof, means for rotating said fan and means for feeding dust into said air before it enters the space described by said fan.

13. In a dry powder duster, a funnel-shaped housing open at both ends, a revoluble fan in said housing, a second revoluble fan adjacent the larger end of said housing, the axes of said fans and said funnel-shaped housing coinciding, said fans being adapted when rotated to cause air to pass through said housing in a generally axial direction from the smaller to the larger end thereof, means for rotating said fans, and means for feeding dust into said air.

14. In a dry powder duster, a funnel-shaped housing, open at both ends, a revoluble fan outside of said housing adjacent the larger end thereof adapted when rotated to draw air through said funnel from the smaller to the larger end thereof and discharge it into the atmosphere, means for rotating said fan, and means for feeding dust into said air.

15. In a dry powder duster, a material-supply hopper, said hopper having an opening adapted to discharge material therefrom, means for creating a relatively large, rotating stream of air, and means for radially confining a relatively small stream of air, causing it to flow past said opening, entrain material discharged therefrom and enter said relatively large stream.

16. The method of forming a dust cloud which consists of causing dust to mingle with a relatively small stream of rapidly moving air thus forming a stream of densely dust-laden air, passing said dust-laden air through the space described by a rapidly revolving fan, simultaneously causing additional air to mingle with said dust-laden air thereby reducing its dust density, and blowing the resultant diluted mixture into the atmosphere.

17. In a multiple stage dry powder duster, two fans arranged in series, the first of said fans discharging its output into the zone of action of the second fan, the second of said fans being a propeller fan having its blades inclined to its axis of rotation and discharging its output in an axial direction into the atmosphere, and means for feeding dust into the air before it passes through the space described by the first fan of the series.

18. The method of forming dust clouds which consists of feeding dust into a rapidly moving stream of air, whereby said dust is caused to mingle with and is carried along by said stream of air forming a densely laden stream, imparting to said densely laden stream a rapid rotary movement whereby the particles of dust are separated and diffused, simultaneously admitting previously unmixed air into said rapidly rotating stream whereby said densely laden stream is diluted by and mingles with said unmixed air, and discharging said diluted stream of air and dust into the atmosphere.

19. In a dry powder duster, a supply hopper adapted to be carried upon the front of the body of the operator, a duct below said hopper extending in a direction cross-wise of the body of the operator, a fan at one end of said duct adapted when rotated to draw air therethrough and discharge it into the atmosphere, a shaft for said fan also extending in a direction cross-wise of the body of the operator, means for feeding dust from said hopper into said duct, a hand-crank mounted upon the duster, and speed-multiplying driving-connections between said crank and said fan shaft.

20. In a dry powder duster, a supply hopper, a duct below said hopper, a revoluble fan at one end of said duct adapted to draw air therethrough and discharge it into the atmosphere, a dust-feeding passage between said hopper and said duct, a worm wheel mounted for rotation about its axis in said passage, a shaft for said fan extending past said worm-wheel, and a worm on said shaft operatively engaging said worm-wheel.

21. The method of forming dust clouds which consists of feeding the dust into a relatively rapid-moving, small stream of air whereby the dust is caused to mingle with and is carried along by said air in a relatively, densely dust-laden stream, radially confining and longitudinally directing said stream past the point where the dust enters it, then causing the stream to be greatly enlarged in cross section, adding more air to the stream, imparting a rapid rotating motion to it, and finally discharging it into the atmosphere in a relatively slow-moving, large stream of diluted dust-density.

22. In a dry powder duster, a supply hopper, a duct below said hopper, a revoluble fan at one end of said duct adapted to draw air therethrough and discharge it into the atmosphere axially from said fan, dust-feeding means for feeding dust from said hopper into the air in said duct before it passes through said fan, means for driving said fan and means for operating said dust-feeding means.

23. In a dry powder duster a revoluble fan having an axial intake opening and an axial discharge opening, a duct connected to said intake opening, said fan being adapted to draw air through said duct and discharge it into the atmosphere, a supply hopper, means for feeding dust from said hopper into said duct and means for rotating said fan.

24. In a dry powder duster a receptacle adapted to contain the material to be sown broadcast, a revoluble fan, a duct adapted to conduct air to the intake of said fan, means for causing material from said receptacle to mingle with said air before it passes through the space described by said fan, and another revoluble fan adapted to receive the output of said first named fan and discharge it into the atmosphere axially of said fan.

25. In a dry powder duster, a receptacle adapted to contain the material to be sown broadcast, a revoluble fan, a duct connected to conduct air to the intake of said fan, means for causing material from said receptacle to mingle with said air before it passes through the space described by said fan, and another revoluble fan disposed to receive the output of said first named fan, draw in additional air not delivered by said first named fan, mix said output with said additional air and discharge the thus diluted mixture into the atmosphere.

26. The method of forming dust clouds which consists of feeding the dust into a rapidly moving stream of air whereby said dust is caused to mingle with and be carried along by said stream of air, forming a densely laden stream, directing said densely laden stream into previously unmixed air impelled by a propeller fan whereby said densely laden stream is diluted and mingles with said unmixed air.

27. The method of forming dust clouds which consists of feeding a mixture of dust and air into an unconfined, rotating, rapidly-moving column of air whereby the particles of dust are separated, diffused and carried along in said column of air.

28. The method of applying insecticide powder to vegetation which consists of feeding the powder into rapidly-moving gas of relatively small volume whereby said powder is caused to mingle with said gas to form a relatively dense mixture therewith, passing said relatively dense mixture into another current of gas of relative large volume impelled by a rapidly revolving fan whereby said dense mixture is diluted and mingles with said last named gas, and directing said diluted mixture into the atmosphere where it may settle on the vegetation.

29. In apparatus for forming dust clouds, a material-supply hopper having a discharge outlet for material, means for causing a relatively small stream of air to flow past and induce suction upon said outlet, means for creating a relatively large rotating stream of air and means directing said small stream into said large stream after said small stream has passed said outlet.

30. An apparatus for forming dust clouds comprising means for mixing dust with a moving stream of gas to form a mixture of dust and gas, a propeller fan, means for rotating said fan, and means for directing said mixture of dust and gas into the blast from said propeller fan.

31. In a dry powder duster, a receptacle adapted to contain material to be sown broadcast, a revoluble propeller fan having its blades inclined to its axis of rotation, a duct having an air inlet and an air outlet opening, means for causing air to enter said inlet, flow through said duct and out of said outlet, means for causing material from said receptacle to mingle with said air in said duct, and means for revolving said propeller fan to create a blast enveloping the air and material flowing out of said outlet, whereby said material is diffused and broadcast by said blast.

32. In apparatus for dry powder dusting, a supply hopper, a duct, a propeller fan having its blades inclined to the axis of its rotation adapted when rotated to cause air to pass through said duct, means for rotating said fan, and dust feeding connections from said hopper to said duct, said duct being adapted to discharge said air in a direction to cause it to mingle with and be carried along by the blast of said propeller fan.

33. Apparatus for forming dust clouds comprising means for mixing dust with a moving stream of gas and means for discharging the mixture of dust and gas into unmixed gas impelled by a propeller fan.

34. In a dry powder duster, a dust supply hopper, a duct, a feed opening from said hopper to said duct, means for causing gas to flow through said duct past said opening, entrain dust therefrom and discharge it from said duct, a propeller fan adapted when rotated to impel a large blast of air that has not passed through said duct and means for rotating said fan to cause its blast to carry along, mingle with and diffuse the dust and gas discharged from said duct.

35. The method of applying insecticide to vegetation which consists in creating an axially-moving, rotating column of air, entraining comminuted insecticide in a moving stream of gas, causing said column of air and said stream of gas with its entrained insecticide to mix, and directing the resulting mixture where said insecticide will settle upon the vegetation.

36. The method of broadcasting dry powder which consists of preliminarily mixing it with gas to cause the gas to be densely laden with the powder, and subjecting said densely laden gas to the action of a rotating and longitudinally moving column of air thus diluting the density of the mixture of the powder and gas and spreading the powder over a wide area.

37. The method of forming dust clouds which consists in creating a relatively large rotating stream of air, and conveying dust material in suspension in a relatively small stream of gas into said relatively large rotating stream whereby the dust material is diluted and diffused in said relatively large stream.

38. The method of forming dust clouds which consists of diluting and diffusing a mixture of gas and dust with a rotating blast of previously unmixed gas.

39. The method of applying insecticide powder to plants which consists in feeding the powder into a rapidly moving column of gas of relatively small volume whereby said powder is caused to mingle with said gas to form a relatively dense mixture therewith, directing said relatively dense mixture into a relatively large, axially moving and rotating column of air whereby said relatively dense mixture is diluted and the dust is diffused in said relatively large column of air, and directing said large column of diffused dust and air into the atmosphere near said plants.

In testimony whereof I affix my signature.

LESLIE G. HENNING.